S. M. JOINER.
MEASURING INSTRUMENT.
APPLICATION FILED DEC. 19, 1912.
1,181,388.
Patented May 2, 1916.
2 SHEETS—SHEET 1.
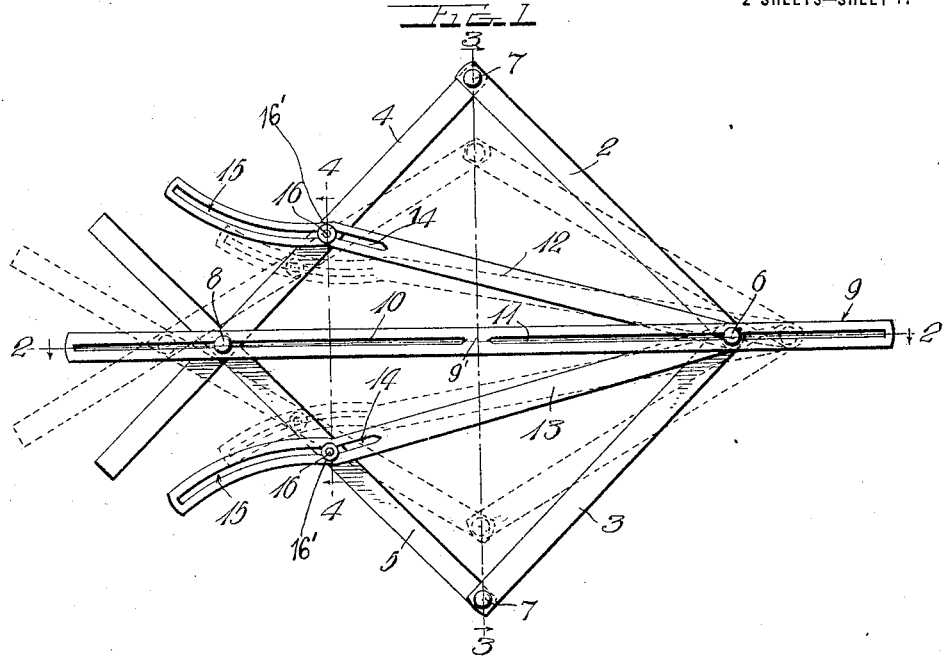
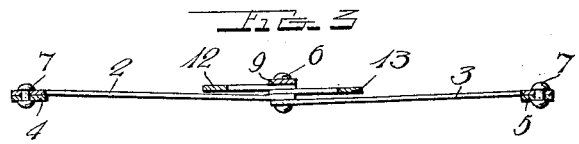
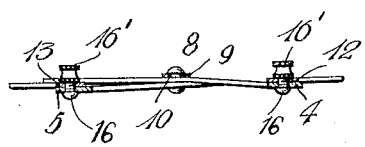
Witnesses
A. Van Loock
S. M. McColl
Inventor
S. M. Joiner
By H. B. Willson & Co
Attorneys S. M. JOINER.
MEASURING INSTRUMENT.
APPLICATION FILED DEC. 19, 1912.
1,181,388.
Patented May 2, 1916.
2 SHEETS—SHEET 2.
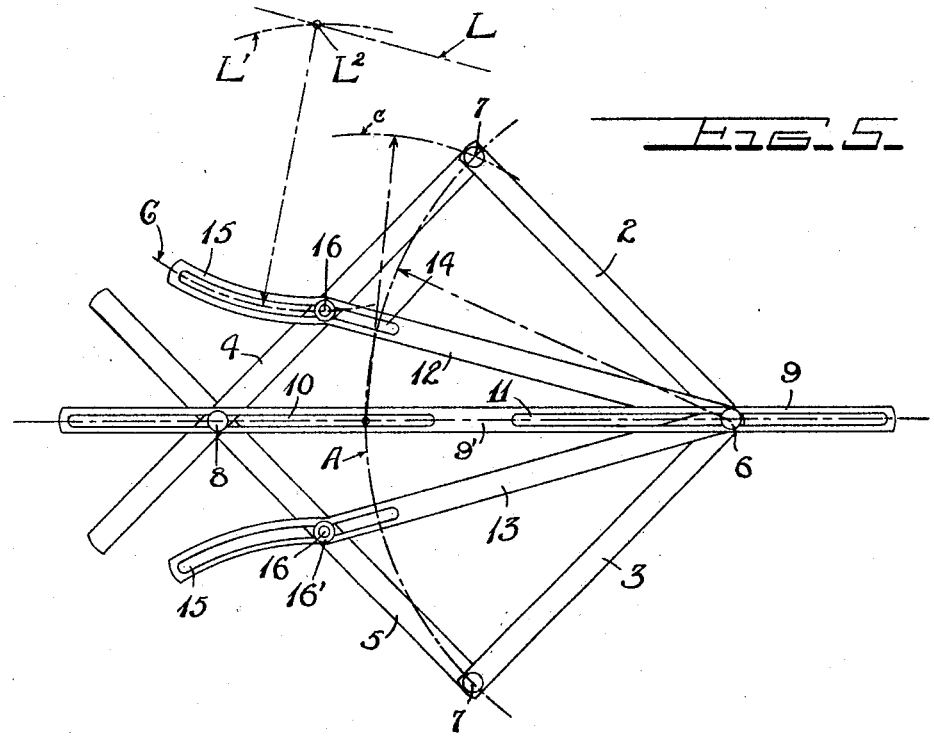
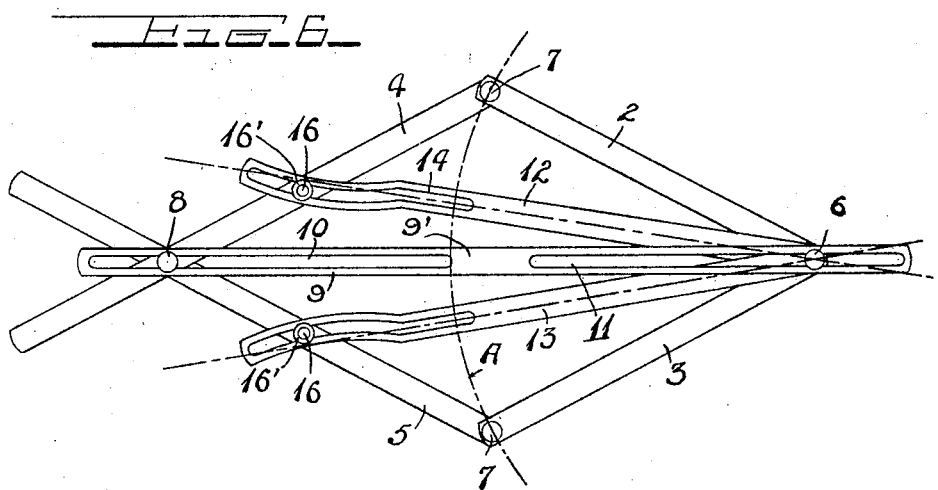
Witnesses
Edwin B. Hunt.
Inventor
S. M. Joiner.
By H. B. Wilson & Co.
Attorneys

UNITED STATES PATENT OFFICE.

SEABORN M. JOINER, OF PORTERSVILLE, CALIFORNIA.

MEASURING INSTRUMENT.

1,181,388.  Specification of Letters Patent.  Patented May 2, 1916.

Application filed December 19, 1912. Serial No. 737,703.

*To all whom it may concern:*

Be it known that I, SEABORN M. JOINER, a citizen of the United States, residing at Portersville, in the county of Tulare and State of California, have invented certain new and useful Improvements in Measuring Instruments; and I do declare the following to be a full, clear, and exact description of the invention, such as will enable others skilled in the art to which it appertains to make and use the same.

This invention relates to improvements in measuring instruments and more particularly to instruments designed for angle trisection.

The object of the invention is to provide a simple and reliable instrument for bisecting and tri-secting angles without any calculating being necessary.

With this and other objects in view, the invention consists of certain novel features of construction, and the combination and arrangement of parts as will be more fully described and claimed.

In the accompanying drawings: Figure 1 represents a plan view of a measuring instrument constructed in accordance with this invention shown in full lines in one position and in dotted lines in another position; Fig. 2 is a longitudinal section taken on the line 2—2 of Fig. 1; Fig. 3 is a transverse section taken on the line 3—3 of Fig. 1; Fig. 4 is a similar view taken on the line 4—4 of Fig. 1. Fig. 5 shows a diagram illustrating the manner in which this instrument is constructed; Fig. 6 is a similar view showing the instrument in partially collapsed position.

In the embodiment illustrated, a frame 1 is shown composed of two bars 2 and 3 pivotally connected at one end by a rivet 6 and to longer bars 4 and 5 pivotally connected at one end to the free ends of the first mentioned bars by rivets 7 and having their free ends crossed one upon the other and pivotally connected by a rivet 8 at points spaced from the pivot 7 a distance corresponding to the length of said arms or bars 2 and 3 to provide a frame, the four side members of which are of the same length. The crossed ends of the bars 4 and 5 project the same distance beyond the rivet 8 and are designed as handles to assist in manipulating the device.

A longitudinally slotted angle bisecting bar 9 is slidably mounted on the rivets 6 and 8, slots 10 and 11 being provided for this purpose, said slots extending throughout the greater portion of the length of said bar and being spaced apart at their inner ends by a solid portion 9' which strengthens the bar and prevents spreading of the side walls of the slots thereof. The rivets 6 and 8 are sufficiently loose to permit the bar 9 to slide freely thereon and the side bars of the frame to swing freely to permit opening and closing of the frame to adapt it for use in measuring or dividing different angles.

Two trisecting bars 12 and 13 have one end pivotally mounted on the pivot 6 and their other ends are longitudinally slotted for about one-third of the length thereof, the inner portions of said slots for about one-fourth of their length being straight as shown at 14 and the remaining three-fourths thereof curved as shown at 15 to adapt the bars 2, 3, 12 and 13 to maintain an equidistant relation to each other during the opening and closing of the instrument for accurately trisecting an angle. Thumb nuts 16' engage screws 16 which extend through the slots of the bars 12 and 13 and engage apertures in the bars 4 and 5, the position of said apertures being determined by means to be described.

In constructing this instrument, the four bars 2, 3, 4 and 5 of the frame 1 having been connected as above described, the connecting point of the bars 12 and 13 with the frame bars 4 and 5 is determined by drawing an arc line A of 90°, of which the pivot 6 represents the center. This arc line is graduated into degrees with the pivots 7 disposed at the ends thereof as shown in Fig. 5. The two bars shown at 12 and 13 which are pivotally connected at 6 with each other and with the connected ends of the bars 2 and 3, cross this arc line at 30° from the ends of said line and from each other and the points where said bars 12 and 13 cross said line divide it into thirds and cause said bars 12 and 13 to cross bars 4 and 5 at the points indicated by the set screws 16 at which points the apertures to receive said set screws are formed in said bars 4 and 5. By experiment it was found that these bars 12 and 13 would not properly trisect an angle when the slots therein were straight throughout their length and to enable them to accurately trisect an angle when mounted as above set forth, it was found necessary that these slots be curved throughout about three-fourths of their length toward their free ends and that the radius of the curve C on which the slotted portions 15 are formed should be equal to a chord or straight line drawn from the center of one of the pivots 7 to the point 9ª where the arc line A intersects the longitudinal axis of bar 9. Then using the point 9ª where the arc line A crosses the longitudinal axis of the bisecting bar 9 as a center, and the radius obtained as above described, an arc $c$ was struck through one of the pivots 7. The line L parallel with one of the bars 12 or 13 and spaced from the inner edge thereof a distance equal to the radius of the curve $c$ was then drawn, (see Fig. 5). Then using screw 16 as a center, an arc line L' was struck through the line L, the radius used being the same as that used for arc $c$ and the point of intersection of said lines L and L' as shown at $L^2$ formed the center of the curve C on which the slot 15 of bar 12 was formed, the radius of this curve C corresponding to the radius of the curve $c$.

In the operation of this instrument, the nuts 16' are loosened and the bars 2 and 3 are placed with their longitudinal axes on the lines forming the angle to be measured and the bars 9, 12 and 13 would automatically adjust themselves during the arrangement of the bars 2 and 3 to divide said angle bar 9 bisecting it and the bars 12 and 13 trisecting it. The nuts 16' are then tightened to hold the parts of the instrument in adjusted position and the bars 2, 3, 12 and 13 between the pivots 6, 7 and 8 will correspond to the angle measured. The bars 2, 3, 4 and 5 being pivotally connected and the bisecting and trisecting bars also pivotally connected, it will be obvious that the instrument may be contracted and expanded to fit the angles of any desired size, and that the bars 12 and 13 will automatically trisect the angle and the bar 9 will bisect it. The bar 9 is slotted to provide for its longitudinal adjustment to adapt the bisecting line to be drawn of any desired length.

I claim as my invention:

1. An angle measuring instrument comprising a quadrilateral frame, the members of which are pivotally connected one to another, angle dividing means comprising two bars pivotally mounted on one of the pivots of said frame and diverging with their free ends slidably and pivotally connected with two of the side members of the frame, and means for holding said dividing means in adjusted position.

2. An angle measuring instrument comprising a frame, the members of which are pivotally connected one to another, the length of the members between said pivots being equal, angle dividing bars pivotally mounted at one end on one of the pivots of the frame and slotted longitudinally, and set screws extending through said slots and engaging two of the members of said frame.

3. An angle measuring instrument comprising a frame, the members of which are pivotally connected one to another, the length of the members between said pivots being equal, angle dividing bars pivotally mounted at one end on one of the pivots of the frame and slotted longitudinally at their free ends for about one-third of their length, said slots being straight approximately one-fourth of their length at their inner portions and the remainder curved inwardly, and set screws extending through said slots and engaging two of the members of said frame at points spaced from the pivotal connection of said members.

4. An angle measuring instrument comprising an equilateral quadrilateral frame, the side bars of which are pivotally connected, angle trisecting bars pivotally mounted at one end on one of the frame pivots, said bars being slotted longitudinally, and set screws extending through said slots and engaging two of the side bars of said frame.

5. An angle measuring instrument comprising an equilateral quadrilateral frame, the side bars of which are pivotally connected, angle trisecting bars pivotally mounted at one end on one of the frame pivots, said bars being slotted longitudinally at their free ends, set screws extending through said slots and engaging two of the side bars of said frame, and an angle bisecting bar slotted longitudinally and slidably engaged with diagonally opposite frame pivots, said bisecting bar extending between said trisecting bars.

In testimony whereof I have hereunto set my hand in presence of two subscribing witnesses.

SEABORN M. JOINER.

Witnesses:
C. C. SAMSWORTH, Jr.,
HUGH TEMPLETON.

Copies of this patent may be obtained for five cents each, by addressing the "Commissioner of Patents, Washington, D. C."